US005237803A

United States Patent [19]

Domingue, Jr.

[11] Patent Number: 5,237,803

[45] Date of Patent: Aug. 24, 1993

[54] CENTRIFUGAL COMBINATION SPRAYER/CUTTER APPARATUS

[76] Inventor: Lucas Domingue, Jr., Rte. 3, Box 530, Carencro, La. 70520

[21] Appl. No.: 830,834

[22] Filed: Feb. 4, 1992

[51] Int. Cl.[5] ...................... A01C 15/00; A01D 34/82

[52] U.S. Cl. ...................................... 56/16.8; 56/14.7; 239/DIG. 6

[58] Field of Search ....................... 56/14.7, 16.8, 255; 239/214, 222.11, DIG. 6

[56] References Cited

U.S. PATENT DOCUMENTS

| | | | |
|---|---|---|---|
| 2,878,633 | 3/1959 | Mullin | 230/DIG. 6 X |
| 2,908,444 | 10/1959 | Mullin | 56/16.8 X |
| 2,939,636 | 6/1960 | Mullin | 239/214 X |
| 3,097,467 | 7/1963 | Konrad | 56/16.8 X |
| 4,185,782 | 1/1980 | Belrose | 239/222.11 X |
| 4,926,622 | 5/1990 | McKee | 56/16.8 |

*Primary Examiner*—George A. Suchfield

*Attorney, Agent, or Firm*—Pravel, Hewitt, Kimball & Krieger

[57] ABSTRACT

An apparatus or system for delivering a pesticide spray to a predetermined area, which includes a container for the pesticide to be delivered; a spraying portion, further including a substantially circular rotating member positioned on a central rotating axis; an upper circular shield positioned above and extending beyond the outer perimeter edge of the rotating member; a nozzle for injecting a quantity of pesticide onto the rotating member; a splash guard on the circular shield for directing the spray from the edge of the rotating member to the area of weeds below the shield covering the rotating member; and a powered device for moving the spraying member along the weeds to be sprayed, and for delivering the quantity of pesticide to the weeds. The apparatus may further include a rotating blade for cutting the weeds as the spray of pesticide is delivered beneath the circular shield.

17 Claims, 5 Drawing Sheets

CENTRIFUGAL COMBINATION SPRAYER/CUTTER APPARATUS

BACKGROUND OF THE INVENTION

1. Field of The Invention

The apparatus of the present invention relates to weed control. More particularly, the present invention relates to an apparatus or system for controlling weeds by introducing a spray of pesticide, such as fertilizers and/or insecticide, or herbicide, beneath a cover, such as a backcutter, during the cutting of the weeds.

2. General Background

In the art of weed control with the use of pesticides, it has become a grave concern of environmentalists, and of the Environmental Protection Agency (EPA) itself, that the spraying of pesticides, which commonly includes insecticides, herbicides and/or fertilizers, to control or eradicate weed growth must be done in a very controlled environment, and with the use of only certain approved pesticides. For example, one area which is a great concern is the control of weed growth along highways. In the past, the task was achieved simply, but somewhat expensively, by spraying the weed growth as a supplement or in the place of cutting the weed growth along the highway, or in the medians between divided highways. This mode of weed control has proven to be unsuitable because of the toxic nature of certain pesticides to surrounding plant and animal growth, and because when the pesticides are sprayed from conventional nozzle sprayers, at the end of a hose or the like, the wind tended to carry the vaporized spray into the highway path itself, which not only created a potential health hazard to passing motorists, but also, may have caused property damage to the vehicles on the highway.

Therefore, the EPA has developed stringent guidelines both in the types of pesticides that may be used, and in addition, to the manner in which they may be delivered. Even with the approved pesticides being used, the application of the pesticide must avoid the movement of the pesticide from the area being sprayed, and must be confined to that area. Therefore, there is need for a means to apply the pesticide which will provide the intended result, and yet, may be within the reasonable costs in order to carry out the use.

Other objects of the invention will be obvious to those skilled in the art from the following description of the invention.

SUMMARY OF THE PRESENT INVENTION

The apparatus of the present invention solves the shortcomings in the art in a simple and straightforward manner. What is provided is an apparatus or system for delivering a pesticide spray to a predetermined area, which includes a container for the pesticide to be delivered; a spraying portion, further including a substantially circular rotating member positioned on a central rotating axis; an upper circular shield positioned above and extending beyond the outer perimeter edge of the rotating member; a channel formed along the outer edge of the rotating member, with openings for the distribution of pesticide from the channel; a nozzle for injecting a quantity of pesticide onto the rotating member; a splash guard on the circular shield for directing the spray from the edge of the rotating member to the area of weeds below the shield covering the rotating member; and a powered device for moving the spraying member along the weeds to be sprayed, and for delivering the quantity of pesticide to the weeds. The apparatus may further include a rotating blade for cutting the weeds as the spray of pesticide is delivered beneath the circular shield.

Therefore, it is a principal object of the present invention to provide a system for delivering a pesticide to a confined area of weed growth while the delivery system is moved along the ground;

It is a further object of the present invention to provide an apparatus for spraying pesticide which eliminates the consideration of outside wind factors disturbing the spray pattern;

It is a further object of the present invention to provide a pesticide spray system which delivers spray to a confined area and which would allow for cutting of the weed growth simultaneously, so as to eliminate the time and cost of cutting apart from the spraying of the pesticide;

It is a further object of the present invention to provide pesticide spray system which would deliver spray to a confined area and minimizes the drift exposure to outside environment;

It is a further object of the present invention to provide a pesticide spray system and method to reduce skips in spraying by physical indicators of what has bee mechanically cut and sprayed; and It is a further object of the present invention to provide a pesticide delivery system, which includes a precise calibrated application of pesticide being sprayed.

BRIEF DESCRIPTION OF THE DRAWINGS

For a further understanding of the nature and objects of the present invention, reference should be had to the following detailed description taken in conjunction with the accompanying drawings, in which like parts are given like reference numerals, and wherein.

DETAILED DESCRIPTION OF THE PREFERRED EMBODIMENT

Figure 1:
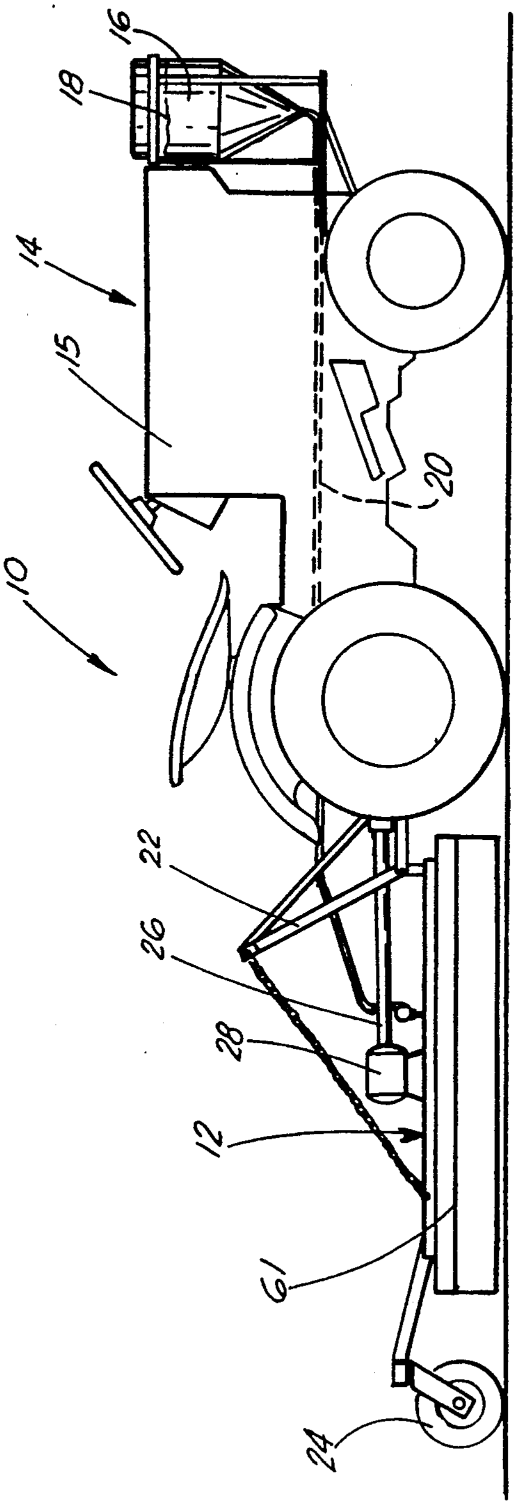
FIG. 1 illustrates an overall side view of the preferred embodiment of the system of the present invention.

FIGS. 1 through 6 illustrate the preferred embodiment of the present invention by the numeral 10. As illustrated, apparatus 10 would comprise the general components of a spraying and/or cutting means 12, which would be pulled by a power means 14, such as a tractor. The tractor 15 would be a typical small tractor which would be driven along the ground, pulling the cutting means 12.

As seen in the overall side view in FIG. 1, the tractor 15 would also carry a container 16 which would be filled with a typical liquid pesticide 18, approved by the EPA, preferably, in the front of the tractor 15, as illustrated. As further seen, there is provided a pesticide line 20, from the container 16 to the cutting/spraying means 12 which would be positioned at the rear of the tractor 15. As illustrated, the cutting/spraying means 12 is a modified cutter which is common in cutting weeds along highways and other large land areas, for weed control, commonly referred to in the art as a "bushhog" or "batwing" cutter, which cuts broad stretches of grass along highway medians or the like.

In general, as illustrated cutting/spraying means 12, as seen in FIG. 1 would comprise a connection arm 22, connected to tractor 15, on the front end and a wheel 24, on the rear end for keeping the cutting/spraying means 12 lifted off the ground below. Further, there is illustrated a drive rod 26 extending from the rear power assembly of tractor 15 for imparting rotation to rod 26 to a gear assembly 28 mounted on top of cutting/spraying means 12, so that the rotation of rod 26 would in turn impart vertical rotation to shaft 30 for rotating the cutting/spraying assembly which will be discussed further. For purposes of clarity, the delivery of the pesticide from the container 16 to the cutting/spraying means 12 would be powered by the tractor 15, and would be regulated by the driver of the tractor, or through an automatic regulating system known in the art.

Figure 2:
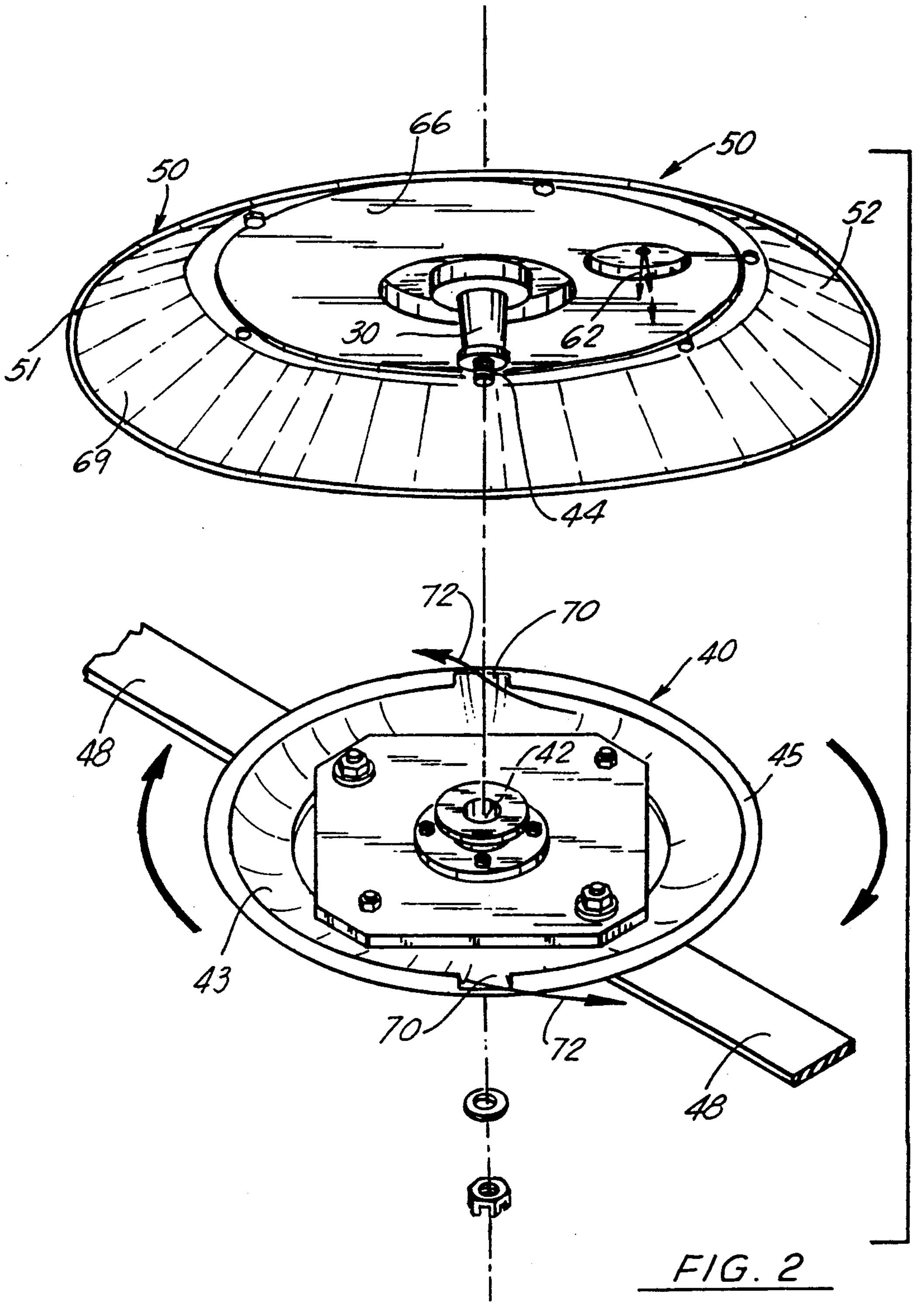
FIG. 2 illustrates an overall partial, exploded view of the cutting and spraying assembly in the preferred embodiment of the present invention.
Figure 3:
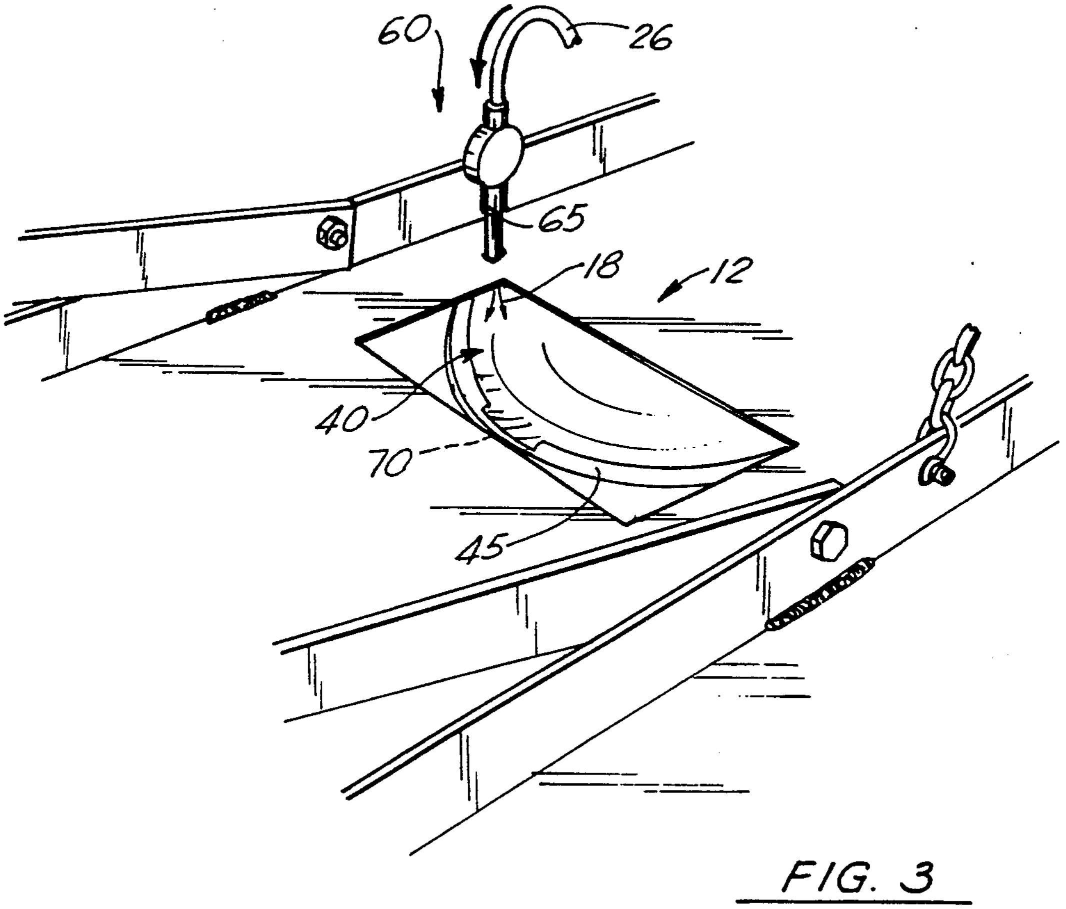
FIG. 3 illustrates a partial view of the nozzle system delivering pesticide to the cutting and spraying assembly of the present invention.
Figure 4:
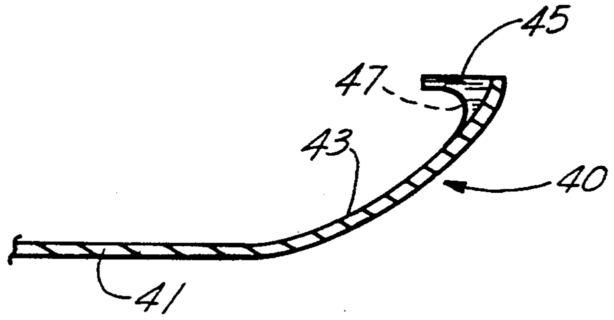
FIG. 4 illustrates a cross section view of the perimeter edge of the circular sprayer of the present invention.

FIGS. 2 through 6 illustrate the spraying/power means 12 in detail, and the functioning of the system 12. As illustrated in FIG. 2 in particular, means 12 would comprise a first rotating circular member 40 having a central bore 42 therein for being positioned o the shaft 30, through threaded member 44, so that rotation of shaft 30 would impart rotation to circular member 40. Circular member 40 would further comprise a reinforcing plate 46, which would secure a pair of cutting blades 48 positioned substantially 180 degrees apart, so that the blades would rotate to cut weeds or the like. Furthermore, there would be provided an overhead circular shield means 50 which would be spaced apart from the rotating cutting blades 48, and would include a perimeter guard means 52 so as to provide that as the weeds are cut by blades 48, the upper shield means 50 directs the cuttings downward long the circular path of the perimeter guard 52. The aforesaid description of the cutting assembly 12 would be quite typical to cutting devices already known in the art.

Figure 5:
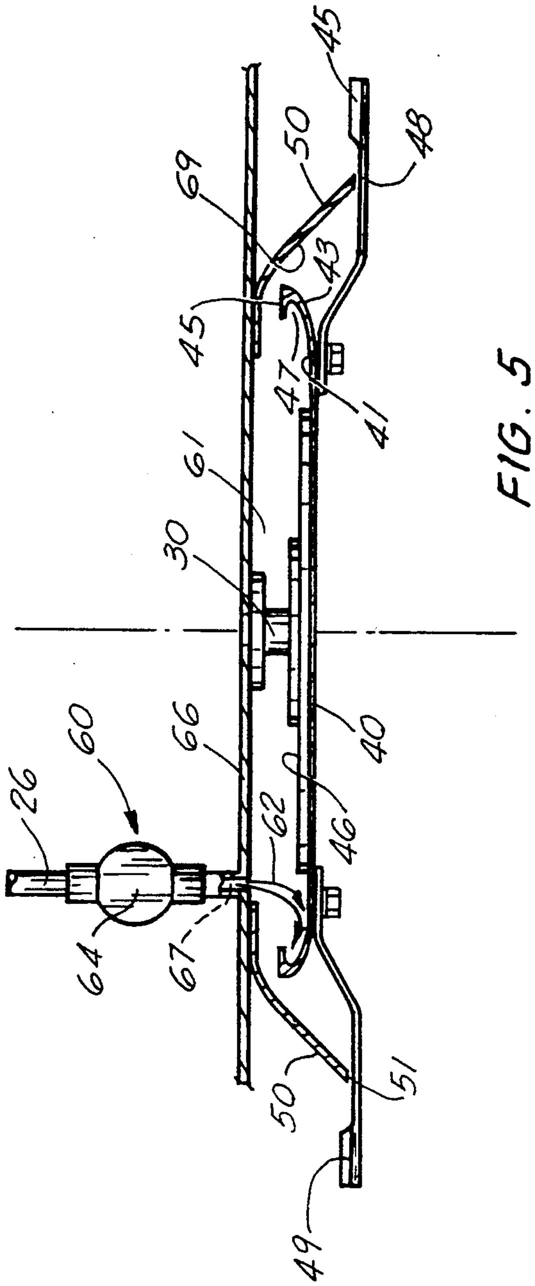
FIG. 5 illustrates in cross-section view the overall view of the sprayer system of the present invention during the spraying process.

However, as seen in the FIGS. 2 through 6, the cutting means 12 has been redesigned to include the new combination of the present invention. As illustrated, the present invention would further comprise a means 60 for delivering a certain, predetermined quantity of liquid pesticide (arrows 62) into undercarriage 61 of cutting means 12. The pesticide would be delivered from tank 16 through line 20 into an electric solenoid valve 64 which would be mounted onto the upper wall 66 of undercarriage 61. Solenoid valve 64 would be controlled by the operator of the tractor, and would allow pesticide through the line 20 and into a delivery channel 67 when the valve was placed in the open position, through which the predetermined measured amount of pesticide would flow as seen by arrows 62. As seen in FIG. 5, the valve 64 would be mounted off center and apart from the central shaft 30, so that the pesticide is directed to the circular member 40 upon which blades 48 are mounted. Circular member 40, as seen in cross section view in FIG. 4 would comprises a generally flat floor portion 41 with an upturned outer perimeter portion 43. The outer portion 43 would further comprise a turned in lip 45, for defining a channel 47 around the perimeter edge of member 40, serving as a means for blocking the indiscriminate flow of pesticide off of the outer edge of circular member 40, as it rotates.

Figure 6:
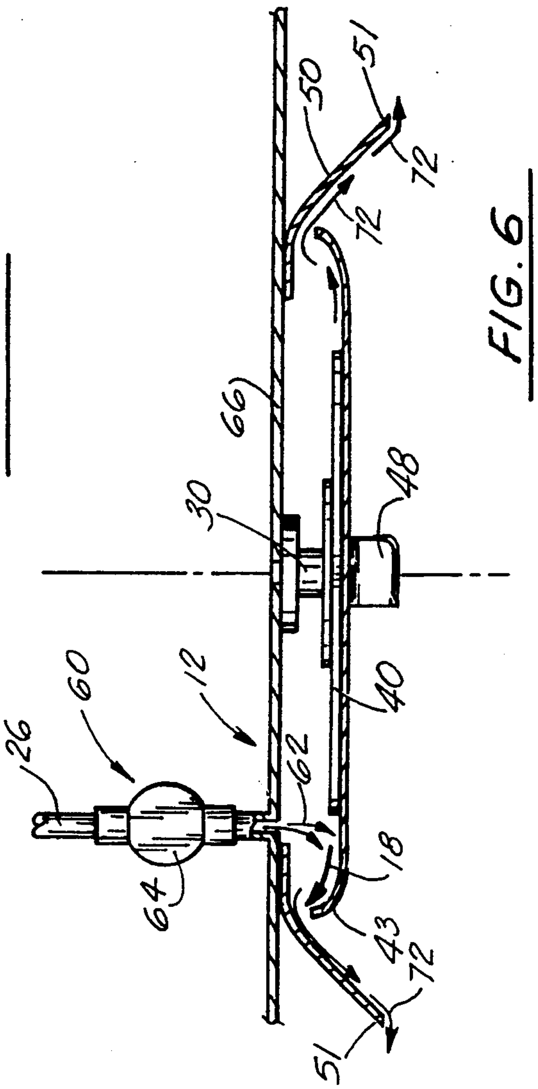
FIG. 6 illustrates in partial view the sprayer system of the present invention during the spraying process, wherein there is depicted the travel of the spray during the process.

As seen in FIG. 2, in overall, exploded view, the lip 45 would be provided with a pair of spaced apart openings 70, each of which are separated approximately 180 degrees apart. As the member 40 is rotated during the cutting action, the pesticide delivered via the delivery system, would, through centripetal force collect in the channel 47, and when the flow of pesticide along lip 45 would reach either opening 70, the pesticide would be sprayed out through opening 70. FIG. 6 clearly illustrates the direction of flow taken by pesticide duration rotation. As illustrated in partial view in FIG. 6, there is depiction of the lip 45, in view of the fact that FIG. 6 is illustrating the travel of the spray (line 18) as it would travel through the openings 70 in the lip 45. Since this Figure is depicting the travel of the spray as Arrow 72, the lip 45 is not necessarily shown. What is shown is that the pesticide 18 flows through opening 70, and that it would make contact with the under face 69 of the shield means 50. Shield 50 forms a continuous annular shield over the rotating member 40, and, illustrated, would extend outward so that the outer edge 51 of shield 50 would terminate at a point near the upper face of the blades 48 as seen in FIG. 5. At that point along blades 48, there would be comprised the upper rear edge 49 as previously defined. FIG. 6 also illustrates the blade 48, which would be positioned on plate 40, as illustrated in FIG. 5. The reason for this will be explained further.

The process of delivering the flow of pesticide 18 during the use of the system is quite unique. As illustrated in the Figures, the container 16 mounted on the front of tractor 15 would, as previously stated, contain a certain amount of pesticide 18 to be sprayed. The operator, through the use of electronic or even computerized delivery systems would activate a pump on the tractor 15 to pump the pesticide through line 20 to the delivery system.

The pesticide would then enter valve 64, which would include a downward spout 65 for delivering pesticide into the undercarriage 61 of the modified "bush hog." The delivery of the pesticide would take place during the cutting process. As discussed, when delivered, the pesticide stream would make contact with the upper face of rotating member 40, and due to the centripetal force, would immediately flow on rotating member 40 and be collected within the channel 47 formed by lip member 45. The pesticide would then reach on of the two openings 70 in lip 45 and would be sprayed, from the force of the rotating member 40, upward and outwardly in the direction of arrows 72, and would encounter upper shield member 50. The pesticide would flow along the under face 69 of upper shield member 50 and would be sprayed from its outer edge, where in turn, the pesticide spray would make contact with the grass confined beneath the undercarriage to be treated.

There are two important points to be discussed regarding the means to deliver and spray the pesticide. It is critical that the space between the outer edge 51 of rotating member 50 be a precise distance from blade members 48, during their rotation, so as to define a very narrow travel space for the pesticide between the blades and the shield 50. This will avoid any carrying of the pesticide spray leaving shield 50 upward into the air and out of the confines of undercarriage 61, which could be environmentally detrimental. This would further minimize the air disturbance caused by the cutting edge of the blade, and reduce the influx of grass cuttings inside the shielded area for achieving a better spray pattern.

Figure 7:
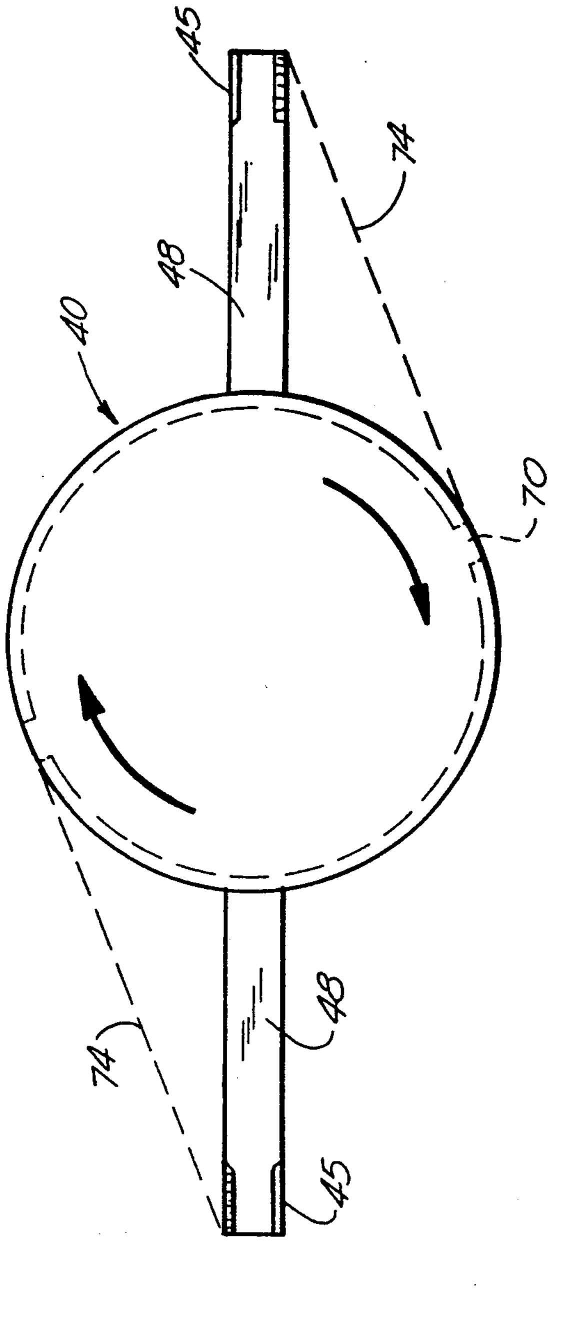
FIG. 7 illustrates a representational view of the relationship between components in the cutting and sprayer assembly of the present invention

Secondly, and as seen in FIG. 7 the distance and position of each of the openings 70 in circular member 40 is critical. As the blades are rotated, the pesticide is sprayed from openings 70. The pesticide, which is "flung" outward by the circular movement of member 40 (see arrows 74), makes contact with the passage of the next blade at cutting edge 53, which would be aligned with the upturned edge 49 of the blade, so that pesticide is not collected on the blade itself. This position along the circular member 40 can be calculated depending on the size of the circular member, and the rotation speed of the blades during cutting process.

Although the discussion of the present invention has been primarily addressed to "bushhogs" and "batwing" cutters, the delivery system could be constructed so as to accommodate any rotary cutter, even lawn mowers, where the blades are rotating within a confined undercarriage. The basic principles of the system would be the same, so that the simultaneous cutting and pesticide treatment of a particular area could be undertaken.

Parts List apparatus 10
spraying/cutting means 12
power means 14
tractor 15
container 16
pesticide 18
pesticide line 20
connection arm 22
wheel 24
drive rod 26
gear assembly 28
shaft 30
circular member 40
central bore 42
threaded member 44
reinforcing plate 46
cutting blades 48
upturned edge 49
shield means 50
outer edge 51
under face 69
outer edge 55
perimeter guard 52
delivery means 60
arrows 62
undercarriage 61
electric shut-off solenoid valve 64
downward spout 65
upper wall 66
delivery channel 67
floor portion 41
outer portion 43
lip 45
channel 47
opening 70
arrows 72
arrows 74
cutting edge 53

Because many varying and different embodiments may be made within the scope of the inventive concept herein taught, and because many modifications may be made in the embodiments herein detailed in accordance with the descriptive requirement of the law, it is to be understood that the details herein are to be interpreted as illustrative and not in a limiting sense.

What is claimed as invention is:

1. A system for cutting and spraying foliage, comprising;

a) a closed-wall undercarriage;

b) a blade rotatably mounted within the undercarriage for cutting grass or the like when rotated;

c) a pesticide;

d) means for delivering a specified quantity of said pesticide into a collection area within the closed-wall undercarriage while the blade is rotated;

e) channel means associated with the collection area for collecting the pesticide delivered onto the collection area;

f) openings in the channel means positioned so that the pesticide is sprayed through the openings as a result of the rotation of the blade; and g) shield means, positioned above the rotating blade to define a means for collecting the sprayed pesticide to deliver the pesticide to the grass beneath the undercarriage.

2. The apparatus in claim 1, further comprising a tractor or vehicle for pulling the apparatus along the ground.

3. The apparatus in claim 1, wherein the undercarriage and blade assembly are a modified bushhog assembly.

4. The apparatus in claim 1, wherein the collection means further comprises a circular plate supporting the blade as the blade is mounted and rotated.

5. The apparatus in claim 1, wherein the channel means is further defined by an upturned lip along the outer edge of the collection means.

6. The apparatus in claim 1, wherein the shield means further comprises an annular place secured to the upper wall of the undercarriage extending downward to define a narrow space between the edge of the annular plate and the rotating blade for the flowing pesticide to travel as it is delivered to the grass below.

7. The apparatus in claim 6, wherein the travel space between the plate and the blade minimizes the air disturbance of pesticides caused by the cutting edge of the blade, and reduces the influx of grass cuttings inside the shielded area for achieving a better spray pattern.

8. A system for cutting and spraying foliage, comprising;

a) a cutting assembly, including a closed wall undercarriage;

b) blade members rotatably mounted upon an annular member within the undercarriage for cutting grass or the like when the member is rotated;

c) a pesticide;

d) means for delivering a specified quantity of said pesticide onto the upper face of the annular member within the closed-wall undercarriage while the blades are rotated;

e) channel means formed on the outer edge of the annular member for collecting the pesticide delivered onto the upper face of the annular member while the member is rotated;

f) openings in the channel means positioned so that the pesticide is sprayed through the openings as a result of the rotation of the annular member during the cutting process; and g) shield means, positioned above the rotating blades to define a means for collecting the sprayed pesticide to deliver the pesticide to the grass beneath the undercarriage.

9. The apparatus in claim 8, further comprising a tractor or vehicle for pulling the apparatus along the ground.

10. The apparatus in claim 8, wherein the undercarriage and blade assembly are a modified bushhog assembly.

11. The apparatus in claim 8, wherein the annular member further comprises a means supporting the blades as the blades are rotated during cutting.

12. The apparatus in claim 8, wherein the channel means is formed by an upturned lip along the outer edge of the annular member.

13. The apparatus in claim 8, wherein the shield means further comprises an annular plate secured to the upper wall of the undercarriage extending downward to define a narrow space between the edge of the annular plate and the rotating blades for the flowing pesticide to travel as it is delivered to the grass below.

14. The apparatus in claim 8, wherein the travel space between the plate and the blades eliminates pesticide from being sprayed out of the confines of the undercarriage walls.

15. The apparatus in claim 8, wherein the position of each of the openings in the channel wall is a distance from where the blades are mounted on the annular member so that depending on the rotation speed of the blades, the sprayed pesticide sprayed from the channels makes contact with the next rotation of the blade at the tip end of each of the blade members to more evenly distribute the pesticide to the grass being cut within the undercarriage space.

16. A system for cutting grass and delivering a pesticide to the grass being cut, the system comprising:

a) a cutting assembly further comprising a rotatable blade within an undercarriage, the rotatable blade confined within the walls of the undercarriage;

b) power means for driving the rotation of the blade during the cutting process;

c) a system for delivering a quantity of pesticide into the space defined within the walls of the undercarriage during the rotation of the cutting blades;

d) an annular member upon which the rotating blades are mounted which would received the liquid pesticide as it enters the undercarriage space;

e) openings in an outer channel formed along the outer edge of the annular member for allowing the pesticide to spray outward from the channels during rotation of the annular member; and f) shield means, positioned above the annular member, and extending outward beyond the annular member to a point defining a narrow fluid passage between the blade and the shield means, for the sprayed pesticide to travel into the area to be sprayed.

17. The system in claim 16, wherein the position of each of the openings in the channel wall is a distance from where the blades are mounted on the annular member so that depending on the rotation speed of the blade, the sprayed pesticide sprayed from the channels makes contact with the next rotation of the blade at the tip end of each of the blade members to more evenly distribute the pesticide to the grass being cut within the undercarriage space.

* * * * *